United States Patent
Kiener et al.

(10) Patent No.: US 6,792,990 B2
(45) Date of Patent: Sep. 21, 2004

(54) DEVICE FOR LAMINATING OR COATING A SUBSTRATE

(75) Inventors: Waldemar Kiener, Lauchheim (DE); Johann Rein, Bopfingen (DE)

(73) Assignee: Kiener Maschinenbau GmbH (DE)

( * ) Notice: Subject to any disclaimer, the term of this patent is extended or adjusted under 35 U.S.C. 154(b) by 0 days.

(21) Appl. No.: 10/305,046

(22) Filed: Nov. 25, 2002

(65) Prior Publication Data

US 2003/0098130 A1 May 29, 2003

(30) Foreign Application Priority Data

Nov. 24, 2001 (DE) .......................................... 101 57 366

(51) Int. Cl.[7] .............................................. B30B 15/34
(52) U.S. Cl. ....................... 156/498; 156/494; 156/555; 156/582
(58) Field of Search ................................ 156/359, 494, 156/498, 555, 580, 582, 583.1

(56) References Cited

U.S. PATENT DOCUMENTS

| | | | | |
|---|---|---|---|---|
| 3,654,020 A | * | 4/1972 | Robinson | .................... 156/291 |
| 4,861,409 A | * | 8/1989 | Hashida et al. | .......... 156/308.2 |
| 5,223,071 A | * | 6/1993 | Gersbeck | ..................... 156/358 |
| 5,582,669 A | | 12/1996 | Gove et al. | ................. 156/239 |
| 6,106,658 A | * | 8/2000 | Kaguma et al. | ......... 156/309.9 |
| 6,546,987 B1 | * | 4/2003 | Tachibana et al. | .......... 156/555 |
| 6,627,262 B1 | * | 9/2003 | Soas et al. | ................... 427/318 |

OTHER PUBLICATIONS

European Search Report, No. EP 02 02 5464, dated Apr. 3, 2003.
Patent Abstract of Japan, Publication No. 57126619, Takao, Publication date Jun. 6, 1982.

* cited by examiner

Primary Examiner—James Sells

(57) ABSTRACT

A device for laminating at least one substrate to an adhesive-coated substrate for forming a laminate, in which the adhesive-coated substrate is supplied to a laminating point formed between a driven roller and a laminating roller, the substrate being supplied by means of the laminating roller to the substrate provided with adhesive and bonded with this substrate in a laminating point; and to a device for coating a layer on a substrate for the production of a coated length of material; the laminate formed from the substrates, or the coated length of material, being guided directly after the laminating point at least over a few angular degrees along the laminating roller; and the laminating roller being constituted as a temperature-adjustable roller.

19 Claims, 3 Drawing Sheets

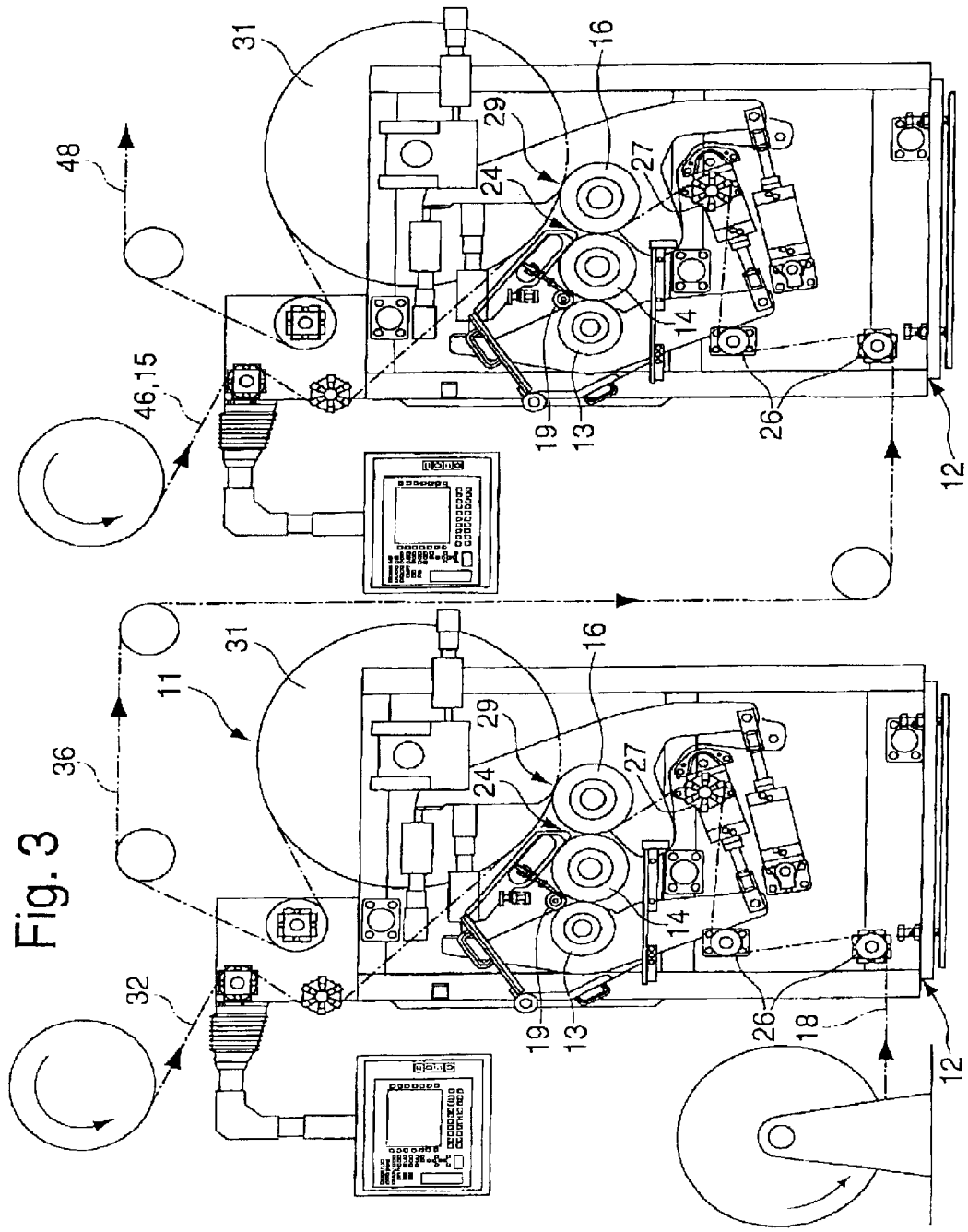

DEVICE FOR LAMINATING OR COATING A SUBSTRATE

CROSS-REFERENCES TO RELATED APPLICATIONS

Not applicable.

STATEMENT REGARDING FEDERALLY SPONSORED RESEARCH TO DEVELOPMENT

Not applicable.

BACKGROUND OF THE INVENTION

The invention relates to a device for laminating a substrate onto an adhesive-coated substrate for forming a laminate, in which the substrate provided with adhesive is supplied to a laminating point formed between a driven roller and a laminating roller, and to a device for coating at least one layer onto a substrate for producing a coated length of material in which the substrate coated with the at least one layer is supplied to a laminating point formed between a driven roller and a laminating roller.

TECHNICAL FIELD

Devices have already become known in which a substrate is laminated onto a first layer coated with adhesive for forming a laminate. For this purpose, a driven roller and a laminating roller are provided, which are spaced apart to form a gap, a laminating point being formed by the gap. The adhesive-coated layer is guided, e.g., horizontally through the gap, so that this layer lies on the laminating roller and the driven roller only in the laminating point. The laminate is guided away after the laminating point by removal from the driven roller and the laminating roller. The same analogously holds for the coated length of material.

Such devices are used for the production of laminates and lengths of material for various end uses. For example, there can be concerned here, air-permeable or breathable textiles, and full-surface, partial, or porous coatings. Also, substrates of different thickness, stiffness and weight per $m^2$ are laminated or coated.

The above-described device has the disadvantage, particularly when laminating two different substrates, in which one substrate is, e.g., heavier than the other, that the laminate comes apart after leaving the laminating point, since the adhesive has not yet completely set in order to bind the substrates firmly together. In particular, with a further roller arranged remote from the laminating point, the laminate can sag, due to which, in particular, the heavier substrate can detach from the lighter substrate. The circumstances are similar for coated lengths of material.

SUMMARY OF THE INVENTION

The invention therefore has as its object to provide a device for the production of a laminate with at least two substrates, or a coated length of material, which makes a firm laminate bond or coating possible, particularly with different substrates or layers, even with large amounts of adhesive.

This object is attained according to the invention by a device for laminating at least one substrate (32) to a substrate (18) provided with adhesive (19) for the formation of a laminate (36), in which the substrate (18) provided with adhesive is supplied to a laminating point (29) formed between a driven roller (16) and a laminating roller (31), the at least one substrate (32) being supplied by means of the laminating roller (31) to the substrate (18) provided with adhesive (19) and bonded to the substrate (18) provided with the adhesive in a laminating point (29), wherein the laminate (36) formed from the substrates (18, 32), at least one substrate provided with adhesive is guided directly after the laminating point (29) at least through a plurality of angular degrees along the laminating roller (31), and the laminating roller (31) comprises a temperature-adjustable roller.

The object is also attained by a device for coating at least one layer (15) onto a substrate (18) for the production of a coated length of material (39), in which the substrate (18) coated with the at least one layer (15) is supplied to a laminating point (29) formed between a driven roller (16) and a laminating roller (31), wherein the length of material (39) formed from the at least one layer (15) and the substrate (18) is guided directly after the laminating point (29) at least through a plurality of angular degrees along the laminating roller (31), and that the laminating roller (31) comprises a temperature-adjustable roller.

By the laminate lying at least over a few degrees of angle on a laminating roller and a simultaneously occurring adjusted temperature, particularly cooling, of the laminate, it is made possible for the adhesive to be transformed from a plastic to a solid state and for a firm bond between two laminated substrates to be constituted. By the resting of the two substrates, laminated together, on the laminating roller, the substrate layers are simultaneously pressed against an envelope surface of the laminating roller between the laminating point and the takeoff of the laminate from the laminating roller, so that a bonding of the substrates under at least a little pressure is made possible due to the tension of the length of material. By the constitution of the laminating roller as a temperature-adjusted roller, an increased amount of heat of the heated adhesive and the heat of reaction of the adhesive when setting can be conducted away at least sufficiently. Thereby it is achieved that the laminated substrate is removed from the laminating roller only after the adhesive has solidified, so that a finished laminate is drawn off from the laminating roller.

This similarly holds for the production of coated lengths of material. Here the at least one layer is firmly bonded to the substrate. The advantages and effects are the same in the production of coated length of material as in the production of the above-described laminate.

It is advantageously provided that the laminate after passing through the lamination point is guided along the laminating roller with a wrap angle of at least 45°, preferably at least 180°. It is thereby made possible for the laminate to rest on the laminating roller for a long period and for a sufficient heat removal to be ensured, so that the adhesive has transformed from a viscous or pasty state at least into an adherent and solid state which holds the two substrates together in the laminate, before removal of the laminate from the laminating roller. Furthermore, pressing together of the substrates due to the material tension is attained for a longer dwell time by means of an increased wrap angle.

An embodiment provides that the laminating roller constituted as a cooling roller has at least twice the diameter of the driven roller. By this design, it can furthermore be attained that, e.g., in addition to increasing the wrap angle of the laminate, the path length up to removal from the laminating roller is made greater. Because of the greater diameter of the laminating roller, no delay arises in the working process itself, but the degree of setting of the adhesive considerably increases.

According to a further embodiment, it is provided that the driven roller is preceded by a metering roller and an application roller, and the adhesive is applied to the application roller by the metering roller and is transferred to the substrate carried along on the driven roller. By means of this multi-roller system, a metered adhesive application to the substrate can take place, the substrate preferably being guided through, and the adhesive being applied, between the application roller and the driven roller. The amount of adhesive being applied can be specifically set by means of this multi-roller system. For example, adhesive layers of 5–950 g/m$^2$ can be applied, independently of the roller length. Alternatively to the multi-roller system, sprinkler coating systems or wide slit nozzles can also be used.

By the variable setting of the circumferential speed of the application roller and of the driven roller, it is made possible for the adhesive film present on the application roller to be once more varied in its thickness. For example, a thinner adhesive film can be applied to the substrate than that supplied by the application roller to the application point. At the same time, e.g. in the application of the adhesive to a fabric with a coarser structure, complete impregnation of this fabric can be attained. Substrates with larger depressions on the application side can be coated with adhesive so that these recesses or niches are completely filled with adhesive. In other cases of application it can be attained that an extremely thin layer is applied to the substrate and complete wetting just does not occur, for forming a porous coating, for example. The amount of application of the adhesive film can be application-specifically determined by means of the size of the adjustable gap between the application roller and the driven roller and/or the relative circumferential speed of the two rollers. For example, the circumferential speeds of the application roller and of the driven roller can be adjustable in a ratio of 2:1 or higher.

It is provided that the substrate supplied to the driven roller passes through a heating station before the application of adhesive takes place. A rapid cooling of the adhesive is thereby prevented. Better wetting can occur of substrates with a very uneven or porous surface. In support, it can also be provided that the driven roller can be heated. Likewise, the driven metering roller and the application roller can be heated. The adhesive thus remains viscous, or is at least plastic, in the laminating point, and has the required adhesive properties.

At least one tensioning roller is provided before the driven roller, and supplies the substrate under tension to the driven roller. In this manner, on the one hand the tension of the length of material is regulated or maintained, and on the other hand it is made possible for the substrate to be passed through with a defined course between the application roller and the driven roller, so that also the amount of adhesive application is adjustable.

It is provided that the tensioning roller is arranged to be displaceable relative to the application roller, so that the substrate has a wrap angle to the application roller before reaching the gap between the application roller and the driven roller. The degree of wrap is adjustable by positioning the tensioning roller. By means of the substrate lying in contact over a given amount of the circumference of the application roller, a longer dwell time between the substrate and the adhesive is given, so that better impregnation of the material is attained. In a gap formed between the application roller and the driven roller, the adhesive film is adjusted to the predetermined layer thickness or to the predetermined application weight per m$^2$.

For forming a firm bond between the two substrates forming a laminate, at least one presser roller is provided on the outer circumference of the laminating roller. This can give an after-pressing of the laminate, so that in addition to positioning the two substrates to one another, a further setting of the adhesive can also be effected.

The laminating roller can be adjusted in its spacing from the driven roller.

Thus both a setting to different substrate thicknesses can take place and also a pressing together of individual components of the substrate, in order to form the desired product. For example, the thickness of the adhesive layer between a fabric and a non-woven fabric or a foam layer laminated onto it can be determined.

The laminating roller constituted as a cooling roller has a double jacket design, in which a duct system for the cooling liquid running in the opposite direction is preferably provided. Temperature equalization over the circumference of the laminating roller can thereby be given, so that an amount of heat can be removed at a constant rate. Water is preferably provided as the cooling liquid. Additional coolants such as Glysantin or the like can likewise be added.

The previously mentioned advantages and advantageous embodiments likewise hold for the layer applied to the substrate for the production of a coated length of material.

The present invention is particularly provided for the application of so-called hot melt adhesives, high power adhesives, or adhesives with additives and/or fillers, and having a melting point above 50° C. These adhesives, such as for example thermoplastic adhesives or polymers, thermoplastic resins or reactive adhesives, are suitable for complete or partial coating or for laminating of various substrates such as textiles, fabrics, knitted fabrics, paper, films, and foils. The use of such hot melt adhesives makes possible good processing based on their high viscosity, high productivity based on satisfactory coating at high material speeds, and also because of their environmentally friendly handling.

In the production of coated lengths of material, besides the above-mentioned adhesives, open or closed pore foam layers, non-woven fabric layers, non-woven fabric layers or combinations thereof can also be used. Thus different back-coated starting, intermediate, or finished products can be produced.

For example, for substrates which receive loop pile fabric, cut pile fabric, or filaments, the application of a layer as an adhesive layer or foam layer is sufficient to fix the loops, pile, or filaments to the substrate. There can be mentioned only as examples of this the production of furnishing fabrics, decorative fabrics, knit fleeces, mattress drills or the like. By the contact of the coated substrate with the laminating roller and the presence of a compressing pressure, the loop or cut pile fabrics or filaments can be held and fixed in a desired position with respect to the substrate after passing through the laminating point.

BRIEF DESCRIPTION OF THE DRAWINGS

Embodiments of the invention are described in detail in the following description and the claims.

FIG. 3 is a schematic diagram of two stations, arranged one after the other, for the production of multi-layer laminates.

DETAILED DESCRIPTION OF THE INVENTION

Figure 1:
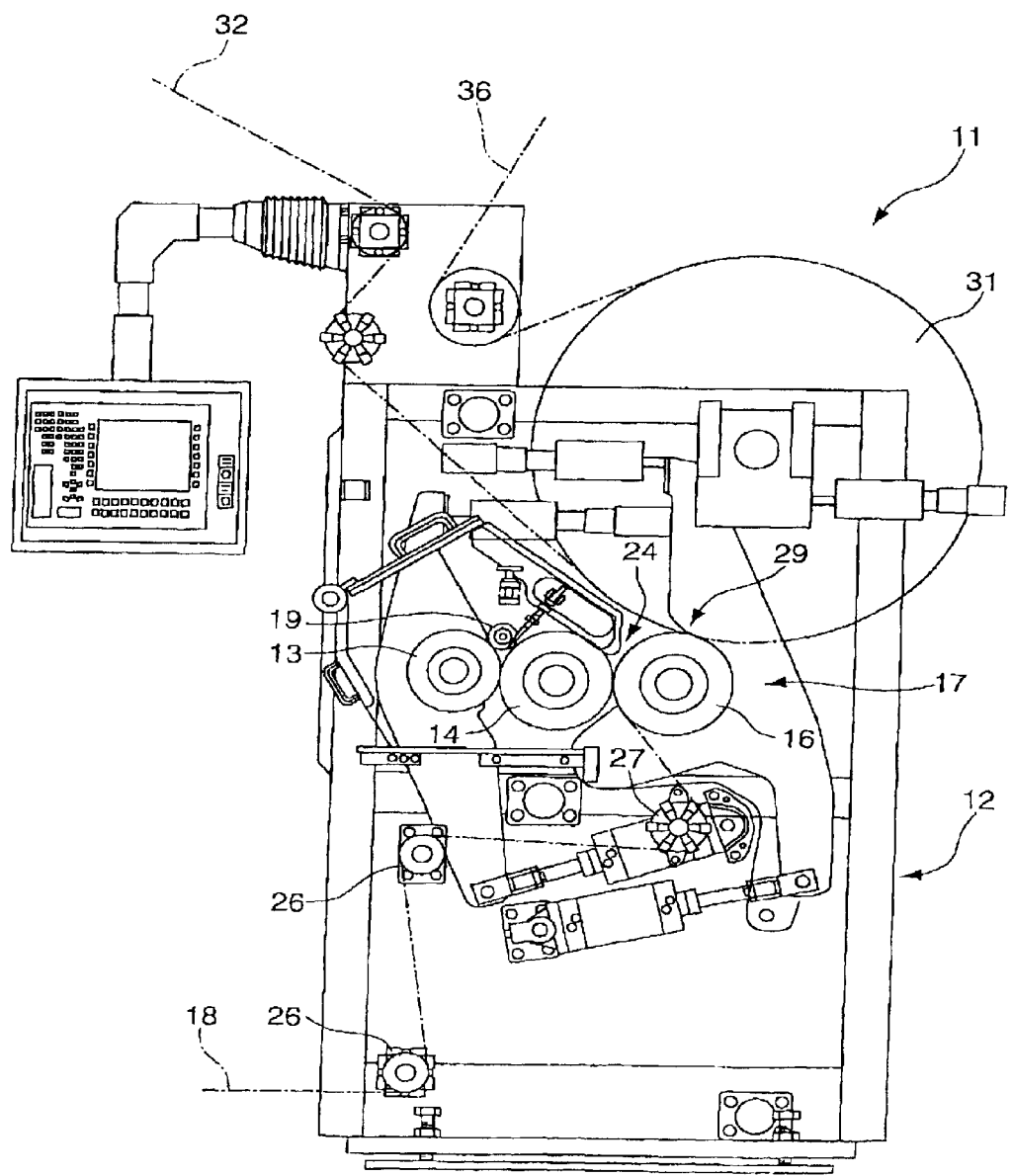
FIG. 1 shows a schematic side view of a multi-roller system with a device according to the invention.

FIG. 1 shows a schematic side view of the device 11 according to the invention. A metering roller 13, an application roller 14 associated with this, and a driven roller 16 in series with the metering roller 13 and application roller 14, are provided on a machine frame 12. The three said rollers 13, 14, 16 form a multi-roller system 17, which is used for coating substrates 18 with an adhesive 19. The metering roller 13, drive roller 14 and roller 16 are arranged substantially in a plane. An adhesive supply is provided between the metering roller 13 and the application roller 14, and the application roller 14, by counterclockwise rotation, transfers an adhesive film therefrom to a gap 24 formed between the application roller 14 and the roller 16. The substrate 18 is supplied to this gap 24 by means of deflecting rollers 26 and at least one tensioning roller 27. After the application of the adhesive 19 to the substrate 18, the substrate 18 coated with adhesive 19 is guided along the driven roller 16 as far as a laminating point 29 which is formed between the driven roller 16 and a temperature-adjustable laminating roller 31.

A further substrate 32 is supplied by means of at least one deflecting roller 26 and a tensioning roller 27 to the laminating roller 31. This substrate 32 preferably lies on the laminating roller 31 before this substrate 32 passes through the laminating point 29. A linear compression acts between the roller 16 and the laminating roller 21, by means of which the substrate 18 with adhesive applied to it is bonded to the substrate 32 in order to form a laminate 36. This laminate 36 rests on the laminating roller 31 after leaving the laminating point 29 and is removed from the laminating roller 31 by a deflecting roller 26 after a wrap of, e.g., 220° of the laminating roller 31. The wrap angle of the laminate 36 on the laminating roller 31 is freely selectable. However, the wrap angle is advantageously chosen as large as possible. The laminating roller 31 is constituted substantially greater in circumference than the driven roller 16, and has at least twice the diameter. The amount of cooling of the laminate 36 can be determined both by the degree of wrap and also the size of the diameter of the laminating roller 31.

Thermoplastic adhesives have the property of forming a connection with further materials above the softening point or melting point, whereas the adhesive action is no longer present after a certain cooling. Thus a minimum temperature must be present at the instant of formation of the laminate 36 in order on the one hand to apply the adhesive and on the other hand to achieve the adhesive action. After the laminating point 29 at which the adhesion takes place it is necessary that cooling takes place before the laminate 36 is removed from the laminating roller 31, in order to attain a firm bonding between the individual substrates 18 and 32. The size of the laminating roller 31 and the wrap angle can be varied in dependence on the material speed, the thickness of the substrates 18, 32 and of the adhesive 19.

The laminating point 29 is provided as close as possible to the gap 24 in which the adhesive layer 19 is applied to the substrate 18, so that the adhesive layer 19 has the required adhesion temperature. The application roller 14 and the driven roller 16 can be heated to support this.

The production of a coated length of material 39 takes place analogously to the production of the laminate 36, no substrate 32 being supplied when a coated length of material 39 is being produced. Otherwise, substantially the same process parameters and conditions are given as in the production of a laminate 36.

Figure 2:
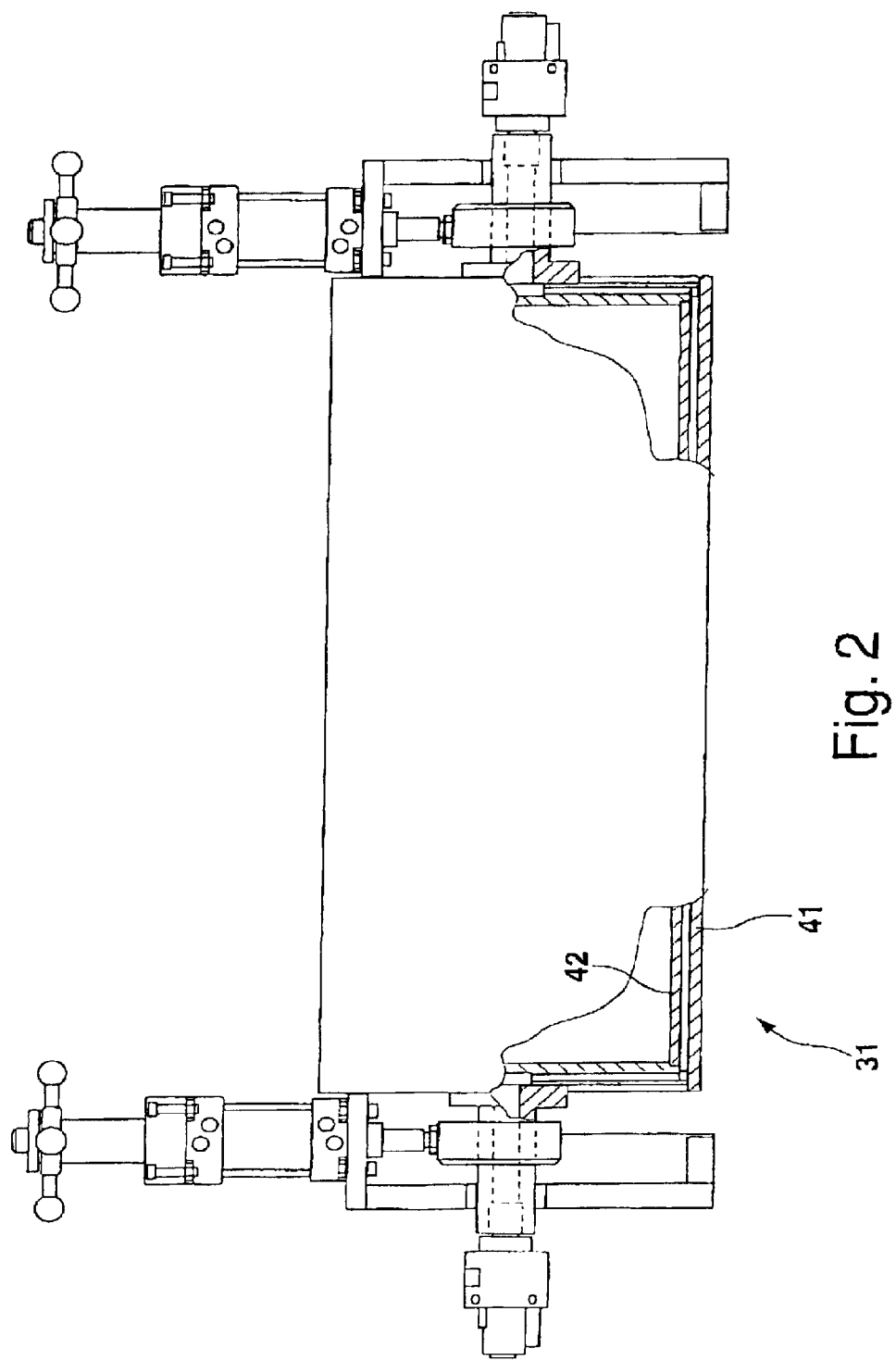
FIG. 2 shows a schematic side view of a temperature-adjustable laminating roller.

FIG. 2 shows a schematic cross section of the temperature-adjustable laminating roller 31. The laminate 36 lies against an outer envelope surface 41. Between an inner envelope surface 42 and the other envelope surface 41, a cooling liquid is passed in countercurrent by means of a duct spiral, not shown in detail, so that the laminating roller 31 has a uniform temperature and makes possible a uniform cooling of the laminate 36 resting on the outer envelope surface 41. The laminating roller 31 is given, for example, a non-stick coating, e.g. with Teflon, is hard chromed, or is constituted of stainless steel. Water or other usual cooling liquid is used as the cooling medium. The laminating roller 31 can likewise be heated. For example, in the use of thermoplastic adhesive, a heating zone can thereby be formed in order to once again heat the laminate or the coating so that a further substrate can be applied or a uniform adhesion of the existing bond is made possible.

According to FIG. 2, the laminating roller 31 is provided on a frame 43. The laminating roller 31 can thereby be used or retrofitted as a modular unit in a multi-roller system 17 or sprinkling coating system, or also in connection with a wide slot nozzle.

The expression "substrate" is to be understood in the wide sense and includes fabrics, warp knit fabrics, woven fabrics, weft knit fabrics, pile fabrics, nonwoven materials, breathable materials, other textiles, foam structures, non-woven fabrics, fibrous tissue, mats or the like. The concept "substrate" furthermore includes not only a single-ply material but also multi-ply composite material or an already produced laminate, which is bonded to one or more further substrates to form a new laminate.

FIG. 3 shows, by way of example, two devices 11 according to FIG. 1, arranged one behind the other. The laminate 36 produced in the first station and consisting, for example, of two substrates 18, 32, is supplied to a second processing station. A further substrate 46 is laminated onto the laminate 36 in order to form a new composite 48. The substrate 46 can be single-layer or likewise constituted as a laminate. Instead of the application of the further substrate, only one layer 15 can also be applied.

The lamination in one or more stations is preferably provided such that the substrate 32, 46 supplied to the laminating point 29 is thinner than the adhesive-coated substrate than the adhesive-coated substrate 18 or laminate 36. This has the advantage that the thinner substrate 32, 46 or the layer 15 lies directly on the laminating roller 31 and the cooling effect can thus be increased.

The metering roller 13, application roller 14, roller 16 and also the laminating roller 31 are driven; the roller 16 and the laminating roller 31 have the material speed.

I claim:

1. Device for laminating at least one substrate (32) to a substrate (18) provided with adhesive (19) for the formation of a laminate (36), in which the substrate (18) provided with adhesive is supplied to a laminating point (29) formed between a driven roller (16) and a laminating roller (31), the at least one substrate (32) being supplied by moans of the laminating roller (31) to the substrate (18) provided with adhesive (19) and bonded to the substrate (18) provided with the adhesive in a laminating point (29), or device for coating at least one layer (15) onto a substrate (18) for the production of a coated length of material (39), in which the substrate (18) and the at least one layer (15) is supplied to a laminating point (29) formed between a driven roller (16) and a laminating roller (31), wherein the length of material (39) formed from the at least one layer (15) and the substrate (18) is guided directly after the laminating point (29) at least through a plurality of angular degrees along the laminating roller (31), and that the laminating roller (31) comprises a cooling roller.

2. Device according to claim 1, wherein the laminate (36) or the coated length of material (39) is guided along the laminating roller (31) with a wrap angle of at least 45° after passing through the laminating point (29).

3. Device according to claim 1, wherein the laminating roller (31) has at least twice the diameter of the driven roller (16).

4. Device according to claim 1, wherein the driven roller (16) is preceded by a metering roller (13) and an application roller (14) which transfers at least one of the adhesive (19) and the at least one layer (15) to the at least one substrate (32, 46) guided along on the driven roller (16).

5. Device according to claim 1, wherein a metering roller (13), an application roller (14), and the driven roller (16) are arranged substantially in a plane running horizontally.

6. Device according to claim 4, wherein a circumferential speed of the application roller (14) and the driven roller (16) are one of equal and are selectively adjustable in a ratio of at least 2:1.

7. Device according to claim 1, wherein the substrate (18) provided with adhesive passes through a heating station, before the substrate (18) provided with adhesive is supplied to the driven roller (16).

8. Device according to claim 1, wherein at least one tensioning roller (27), which supplies the substrate (18) provided with adhesive under pretension to the driven roller (16), is arranged before the driven roller (16).

9. Device according to claim 1, wherein the substrate (18) provided with adhesive is supplied to the driven roller (16) so that the substrate (18) provided with adhesive lies on an application roller (14) at least partially before a gap (24) formed between the application roller (14) and the driven roller (16).

10. Device according to claim 8, wherein the tensioning roller (27) is arranged to be displaceable with respect to the application roller (14) provided with adhesive so that the substrate (18) has a wrap angle, which is adjustable, on the application roller (14) before reaching a gap (24) between the application roller (14) and the driven roller (16).

11. Device according to claim 10, wherein the gap (24) between the application roller (14) and the driven roller (16) is adjustable.

12. Device according to claim 1, wherein at least one presser roller is provided on the outer circumference of the laminating roller (31).

13. Device according to claim 1, wherein the laminating roller (31) is adjustable in distance to the driven roller (16) for metering the laminating point (29).

14. Device according to claim 1, wherein at least one of the driven roller (16), the application roller (14), and the metering roller (13) is heatable.

15. Device according to claim 1, wherein at least one of the driven roller (16), an application roller (14), a metering roller (13), and the laminating roller (31) is driven.

16. Device according to claim 1, wherein the laminating roller (31) comprises a double jacket construction.

17. Device according to claim 16, in which a countercurrent duct system for a cooling liquid is provided.

18. Device according to claim 2, wherein the layer (15) comprises an adhesive layer, in particular a thermoplastic adhesive, as one of a fleece layer, and an open or dosed cell foam layer.

19. Device according to claim 3, wherein the wrap angle is at least 180 degrees.

* * * * *